United States Patent Office 2,909,531

Patented Oct. 20, 1959

1

2,909,531

SUCCINATE ESTERS

Seymour L. Shapiro, Hastings-on-Hudson, Louis Freedman, Bronxville, and Harold Soloway, Yonkers, N.Y., assignors to U.S. Vitamin & Pharmaceutical Corporation, a corporation of Delaware No Drawing. Application January 17, 1958
Serial No. 709,457

1 Claim. (Cl. 260—326.3)

This invention relates to di-(2-[1 - pyrrolidino] - 1-phenyl)ethyl succinate which has outstanding properties as a local anesthetic agent, and the organic and inorganic acid salts thereof.

Generally speaking, where the compounds in accordance with this invention are used therapeutically, the water-soluble salts will be preferred for such use in which the therapeutic agent may be combined with excipients, diluents or lubricants according to known methods of tablet manufacture. The amine salts may also be administered as an aqueous or other suitable solution. When the free base is employed as the anesthetic agent, it may be administered by inhalation as with a nebulizer. When employed as local anesthetics, any suitable method of application known in the art may be employed. These compounds may also be administered in a surgical lubricant jelly base.

EXAMPLE 1

*Di-(2-pyrrolidino - 1 - phenylethyl) succinate dihydrochloride*

A solution of 4.7 g. (0.03 mole) of succinyl chloride in 50 ml. of benzene was brought to reflux. A solution of 11.5 g. (0.06 mole) of 2-pyrrolidino-1-phenylethanol in 100 ml. of benzene was added over 30 minutes with stirring, resulting in an exothermic reaction and precipitation of a dark oil. After 2 hours of reflux, the mixture was cooled, the supernatant benzene decanted, and the black residue triturated with several portions of dry ether. Filtration of the dark powder gave 16 g., M.P. 186–203° C. which after recrystallization from isopropyl alcohol-isopropyl ether mixture melted at 201–202° C. The compound, upon testing for anesthetic effect (guinea pig eye) (by the method of Chance and Lobstein, J. Pharmacol. 82, 203 (1944) had an anesthetic effective $dose_{50}$ of 0.46 mg./ml., and its lethal dose minimum (mice, subcutaneous) was 750 mg./kg.

EXAMPLE 2

*Di - (2 - pyrrolidino - 1 - phenylethyl) succinate dimethobromide*

A 4.3 g. (0.008 mole) portion of the product of Example 1 was taken up in water, made basic with 40% aqueous sodium hydroxide and the free base extracted with ether. The ether extracts were dried over anhydrous magnesium sulfate, filtered and the solvent removed to give 3.7 g. of the free base. This was taken up in 60 ml. of acetonitrile, cooled and 3 g. of methyl bromide bubbled in. After 2 hours, crystals formed which subsequently oiled, then resolidified. After standing 24 hours and filtering, there was obtained 3.1 g. of product which on recrystallization from isopropyl alcohol melted at 123–126° C.

While the compounds herein prepared are *dl* mixtures of potentially optically active forms, the individual optically active *d* and *l* forms of such compounds are to be considered within the purview of this invention.

2

*Therapeutic compositions*

The salt such as the dihydrochloride is mixed in an extender in proportion that is ordinarily as large as required to separate the particles of the ingredient from each other and cause quick solution or dispersion of the active ingredient when contacted with the gastric juice of the stomach.

The excipient used must be nontoxic, edible or potable, and without injurious chemical effect upon the active ingredient. Examples of solid excipients that meet these requirements and may be used are lactose, sucrose, starch, pregelatinized starch, gum arabic, gum tragacanth, acacia or mixtures of them. Suitably, the solid excipient may contain also admixed magnesium stearate, talc, cornstarch, or two or more of these additives to promote separation of the composition from the plunger and mold used in shaping the composition into tablets.

TABLE

*Therapeutic tablet*

| Ingredients: | Weight in mg. |
|---|---|
| Active ingredient (basic ester or its salt) | 50 |
| Sugar | 125 |
| Starch | 25 |
| Acacia | 10 |
| Talc | 3 |
| Magnesium stearate | 2 |
| Stearic acid | 1 |

In alternative tablet compositions, the ingredient may be varied by substituting any material of a given class by any other ingredient described herein for the same purpose, on an equal weight basis.

Water or an isotonic salt solution may be used as a diluent or solvent for the anesthetic.

Special compositions are made for the administration of the anesthetic in various manners.

For use in infiltration anesthesia, solutions are made to contain, for each ml. 1–50 mg. of the anesthetic agent in salt form and sodium chloride 0.3–5 mg. with a preservative, examples being sodium bisulfite 0.2 mg., benzoic acid 0.1–0.3 mg., or chlorobutanol 5 mg., and the whole being diluted q.s. to 1 ml. with distilled water. Preparations are also made including in addition 1 part of epinephrine to 20,000–50,000 parts of the solution.

For topical anesthesia, the preparation contains the anesthetic agent in the form of a salt or free base 50%, benzyl alcohol 43.75%, ephedrine 1%, menthol 5%, and phenol 0.25% by weight.

For ophthalmic ointments, a 0.3–5% solution of the anesthetic agent is made which contains 1 part of epinephrine to 20,000–50,000 parts of the solution in any ophthalmic ointment base such as a slowly water-soluble, non-irritating, and nontoxic aqueous gelatin, methyl cellulose, agar-agar, or like paste.

For ointments used in rectal disorders, a 2%–10% preparation of the anesthetic agent is made in any usual suppository base ointment such as an aqueous, shape-retaining gelatin, agar-agar, or water-soluble nontoxic polymerized glycol.

Having described our invention, what we claim as new and desire to secure by Letters Patent is:

Di(2-[1-pyrrolidino]-1-phenyl)ethyl succinate.

References Cited in the file of this patent

Vanderhaeghe et al.: Bull. Soc. Chim., Belg. vol. 61, pp. 322–327 (1952).

Janssen et al.: Arch. Intern. Pharmacodyn., vol. 103, pp. 83 to 84.